United States Patent [19]

Lou et al.

[11] Patent Number: 4,521,436

[45] Date of Patent: Jun. 4, 1985

[54] REHYDRATABLE RICE PRODUCT

[75] Inventors: Wen C. Lou, Yorktown Hgts.;
Charles V. Fulger, Millwood, both of N.Y.

[73] Assignee: General Foods Corporation, White Plains, N.Y.

[21] Appl. No.: 517,862

[22] Filed: Jul. 27, 1983

[51] Int. Cl.³ .................... A21D 2/00; A21D 10/00; A23L 1/10

[52] U.S. Cl. .................................. 426/104; 426/448; 426/449; 426/458; 426/463; 426/622

[58] Field of Search ............... 426/549, 560, 458, 463, 426/448, 449, 622, 562, 104

[56] References Cited

U.S. PATENT DOCUMENTS

| | | | |
|---|---|---|---|
| 3,974,298 | 8/1976 | Cauvain et al. | 426/463 |
| 4,325,976 | 4/1982 | Harrow et al. | 426/448 |
| 4,364,961 | 12/1982 | Darley et al. | 426/19 |
| 4,394,397 | 7/1983 | Lometillo et al. | 426/448 |
| 4,440,794 | 4/1984 | Davies | 426/578 |

*Primary Examiner*—George Yeung
*Attorney, Agent, or Firm*—Joseph Harcarik; Tom R. Savoie; Daniel Donovan

[57] ABSTRACT

A composition useful for the production of a rehydratable rice product and a method of making such product. The composition includes ungelatinized 90.0 to 99.5 by weight rice flour, 0.2 to 5.0 percent of an aeration agent, 0.1 to 3.5 percent of an emulsifier, and, optionally, up to 1.5 percent by weight of an edible gum. The composition is mixed with water and extruded at temperatures not in excess of 220° F. and dried to make a rehydratable rice product. The extrudate is sized, preferably after drying, into lengths simulating the lengths of rice grains. The product is rehydratable in boiling hot water in 1 to 4 minutes and is particularly suitable for making a rice pudding, in 3–6 minutes.

22 Claims, No Drawings

REHYDRATABLE RICE PRODUCT

FIELD OF THE INVENTION

This invention relates to a rehydratable rice product and in particular to a composition and method suitable for making a rehydratable rice product. More particularly, it relates to such products made from rice flour, rice meal and/or head rice. Still more particularly, it relates to such products which simulate rice grains.

U.S. Pat. No. 4,325,976 describes a process for producing a reformed rice product by the cold extrusion of a dough formed from a composition comprising a mixture of pregelatinized and ungelatinized flour, sodium chloride, and fat in powder form, slicing at the extruder face to obtain simulated rice grains, and then drying the simulated rice grains at an elevated temperature. The reformed rice product produced in this manner rehydrates in water in about three minutes and the time required for the preparation of a simulated rice from such a product is thus significantly reduced.

We have found that a rehydratable rice product can be made from ungelatinized rice flour in a single step, without the addition of sodium chloride and powdered fat, and through a cooking extruder.

BRIEF SUMMARY OF THE INVENTION

In accordance with the present invention, there is provided a composition for the production of a rehydratable rice product comprising from 90.0 to 99.5 percent by weight of ungelatinized rice flour, from 0.2 to 5.0 percent by weight of an aerating agent and from 0.1 to 3.5 percent by weight of an emulsifier.

In accordance with another aspect of the invention, we provide a method of making a rehydratable rice product comprising mixing a composition as described above with water in an amount sufficient to produce an extrudable dough, extruding the dough at a temperature of not more than about 220° F. to produce an aerated extrudate, and drying the extrudate to form a rehydratable rice product.

DETAILED DESCRIPTION

The rice flour used in the present invention is ungelatinized and may be from any type of rice, including long grain, medium grain, short grain, or mixtures thereof. Generally the rice has about a 10 weight percent moisture content. When a long grain is used, a more fluffy and puffy product is produced while medium grain provides firmer textured product and short grain gives a more sticky product. Suitably, the rice flour is employed in amounts from 90.0 percent by weight to 99.5 percent by weight of the composition and preferably from 95 percent by weight to 98 percent by weight.

An aerating agent is used to develop a porous structure in the extruded product which facilitates rehydration and imparts good eating characteristics. Any agent capable of releasing a harmless gas during extrusion of the dough can be used. Suitable agents include baking powder, solid or gaseous carbon dioxide, nitrogen, ammonium carbonate, sodium bicarbonate, and the like. The amount of the aerating agent will generally be from 0.2 to 5.0 percent by weight of the composition, preferably from 0.5 to 3.5 percent by weight and more preferably from 1.0 to 2.0 percent by weight. If the aerating agent is a gaseous material such as gaseous carbon dioxide, the gas needs to be injected at a point into the extruder cavity sufficiently downstream so that a dough has formed a vapor look which is capable of holding the gas. The gas must also be injected sufficiently upstream of the orifice to allow suitable dispersion of the gas. Means for suitably injecting and holding the gas are well known to those skilled in the art.

An emulsifier is used to complex the rice starch during cooker extrusion thus aiding processing by developing a less sticky product and by controlling the rehydration and maintaining the shape of the finished product. The amount of emulsifier is generally from 0.1 to 3.5 percent by weight of the composition, preferably from 0.3 to 3.0 percent by weight and more preferably from 0.5 to 1.5 percent by weight. Suitable emulsifiers include but are not limited to glyceryl monostearate, distilled monoglyceride, diacetyl tartaric acid esters of mono and di-glycerides and mixtures thereof.

Optionally, the composition may include an edible gum. Suitable gums include xanthan gum, guar gum, carrageen gum and mixtures thereof. The purpose of the gum is to act as a binding agent, facilitate rehydration and maintain the shape of the rehydrated product. Depending on the formula the gums may be employed in amounts up to 1.5 percent by weight of the composition and preferably are used in amounts up to 0.5 percent by weight.

Sodium chloride and fat may be employed for organoleptic enhancement but are not essential to the invention.

In making the product, the aerating agent may be introduced either as a solid or gaseous material. In either case the solid components of the composition are admixed to form a dry intimate admixture of the ingredients and then admixed with water and extruded in a food product extruder, such as a cooker extruder. The temperature of the extrudate exiting the extruder may vary from about 160° F. to about 220° F. and preferably from 175° F. to about 205° F. These temperatures are lower than other extrusion temperatures producing finished product such as direct expanded cereal cooking extrusion temperatures which are in the range of about 230° F. to about 380° F. The amount of water is such that the dough formed by mixing with the dry admixture is suitable for extrusion. Mixing can be effected in any convenient manner and is preferably effected in the extruder in which case the dry composition and water may be fed separately thereto. It is preferred to use a minimum amount of water to minimize drying costs. Suitably, the amount of water added is from 8 to 25 percent by weight of the total dry product and from 12 to 20 percent by weight is preferred.

The extruded product is dried in any convenient manner to form a rehydratable rice product. Preferably, drying is effected in convection air at temperatures of 200°–300° F. and preferably at about 250° F.

The extrudate may be comminuted or sized into suitable dimensions to make a product simulating rice grains. Sizing is preferably affected before drying but may be affected after drying. In the former case an extrusion orifice is chosen such that the extrudate is cut as it emerges from the orifice in sizes to form individual rice particles in one of two ways. In one application a die orifice from about 1 mm to 2 mm is employed which forms an extrudate sized to the diameter of rice particles. The extrudate as it exits the extruder is cut into lengths of about 3 mm to 8 mm which sizes the extrudate to the length of rice particles. In another application an oval orifice is employed which is about 3 mm to 8 mm long and about 1 mm to 2 mm wide and sizes the extrudate to the length and width of rice particles. As the extrudate exits the extruder it is cut into widths from about 2 mm to 3 mm to further form particles of appropriate width. The extruded and cut particles have a moisture content of from about 18 to 28 weight percent and are dried to a moisture content of about 8 to 12 weight percent. In an alternative procedure, a rope of textured rice is extruded through an orifice, preferably circular, which is larger than 4 mm and forms a rope diameter larger than 8 mm. The rope is then comminuted into particle sizes of about 5 mm to 8 mm in length and of about 2 mm to 3 mm in diameter using conventional means such as slicing employing an Urschel slicer. In this embodiment the extrudate has a moisture content of about 22 to 26 weight percent to prevent shattering when comminuted. The comminuted particles are then dried to a moisture content of about 8 to 12 weight percent.

The simulated rice particles produced in accordance with the invention are substantially free of sodium chloride and are readily rehydrated in hot or boiling water in a few minutes. With water temperatures of 160° F. up to boiling, rehydration is effected in 1–4 minutes.

In making the product of the present invention either a single screw or twin screw extruder such as a Werner and Pfleider may be used.

The following examples illustrate preferred embodiments of the invention.

EXAMPLE 1

A dry mix consisting of 97.5 percent by weight of medium grain ungelatinized rice flour, 1.5 percent by weight of baking powder and 1 percent by weight of glyceryl monostearate was blended in a ribbon blender and then fed into a Wenger X-20 extruder using the extruder's standard feed screw apparatus. The extruder had four symmetrical oval orifices, each orifice was 1.2 mm in width and 4.5 mm in length. Water was fed to the extruder in an amount of 15 percent by weight of the above dry ingredients. Barrel temperature for each of the five zones of the apparatus was maintained using cooling water and steam as follows:

| Zone No. | 1 | 2 | 3 | 4 | 5 |
|---|---|---|---|---|---|
| Temp. (°F.) | 50 | 90 | 175 | 175 | 150 |

The extrudate exit temperature was 190° F. The screw design was such that significant compression was effected in zone 5. Zones 1–4 were essentially conveying, mixing and equilibrating with only light compression and cooking. The extrudate was face cut into lengths of 2 mm and was then dried for 20 minutes in an air convention oven at a temperature of 250° F. The dried extrudate particles had a moisture content of 9 percent by weight and were oval shaped with widths of 2 mm and lengths of 6 mm. The simulated rice particles were found to be rehydratable in boiling hot water in 3–4 minutes. It was also found that these rice particles could be rehydrated with pudding base mix in 5–6 minutes to make a pudding with a smooth, firm, cohesive texture of rice particles and a fresh cooked rice flavor.

EXAMPLE 2

Example 1 was followed except that an extruder die with an orifice diameter of 4.6 mm was employed and a rope shaped extrudate of 8 mm in diameter was formed. The extrudate was cut into lengths of about 6 feet and dried in a convection air oven for about 15 minutes at a temperature of 250° F. The dried extrudate was then comminuted into rice size particles most having a width of 2 mm to 3 mm and a length of 5 mm to 7 mm. The resultant particles were found to be rehydratable in 1 to 2 minutes in boiling water and formed a pudding with characteristics similar to Example 1.

EXAMPLE 3

Example 2 was followed except that xanthan gum, in an amount of 0.05 percent by weight, was included in the dry mix. The results were substantially the same as in Example 2.

EXAMPLE 4

Example 2 was followed except that the rice flour was 80 percent by weight long grain and 20 percent by weight medium grain. The resultant product was less firm and more fluffy than that of Example 2.

EXAMPLE 5

Example 2 was followed except that the rice flour was 100 percent long grain. The resultant product was very soft and more fluffy than that of Examples 2 and 4.

EXAMPLE 6

Example 2 was followed except that the rice flour was 40 percent medium grain and 60 percent short grain. The resultant product was stickier than that of the above examples.

EXAMPLE 7

Example 2 was followed except that the rice flour was 100 percent short grain. The resultant product was the stickiest of these examples.

What is claimed is:

1. A composition for the production of a rehydrateable rice product consisting of from 90.0 to 99.5 percent by weight of ungelatinized rice selected from the group consisting of rice flour, rice milk, head rice and mixtures thereof, from 0.2 to 5.0 percent by weight of an aerating agent, and from 0.1 to 3.5 percent by weight of an emulsifier.

2. A composition according to claim 1 wherein the composition comprises from 95 to 98 percent by weight of rice flour.

3. A composition according to claim 1 wherein the composition comprises from 0.5 to 3.5 percent by weight of an aerating agent.

4. A composition according to claim 1 wherein the composition comprises from 1.0 to 2.0 percent by weight of an aerating agent.

5. A composition according to claim 1 wherein the composition comprises from 0.3 to 3.0 percent by weight of an emulsifier.

6. A composition according to claim 1 wherein the composition comprises from 0.5 to 1.5 percent by weight of a emulsifier.

7. A composition according to claim 1 wherein the composition further consists of up to 1.5 percent by weight of an edible gum.

8. A composition according to claim 1 wherein said aerating agent comprises baking powder.

9. A composition according to claim 1 wherein said emulsifier comprises glyceryl monostearate.

10. A composition according to claim 1 wherein said ungelatinized rice is short grain.

11. A composition according to claim 1 wherein said ungelatinized rice is medium grain.

12. A composition according to claim 1 wherein said ungelatinized rice is long grain.

13. A method of making a rehydratable rice product comprising:
    (a) mixing a composition as claimed in claim 1 with water in an amount sufficient to produce an extrudable dough;
    (b) extruding said dough at a temperature of not more than 220° F. to produce an extrudate; and
    (c) drying said extrudate to form a rehydratable rice product.

14. A method according to claim 13 wherein said extrudate is sized to form rice particles approximately the size of whole rice grains.

15. A method according to claim 14 wherein the extrudate is sized prior to drying.

16. A method according to claim 14 wherein the extrudate is sized after drying.

17. A method accoriding to claim 13 wherein the dough is extruded through a circular die orifice having a diameter of 1.0 to 2.0 mm, and where the extruded dough is cut into lengths of from 3 to 8 mm.

18. A method according to claim 13 wherein the dough is extruded through an oval die orifice said orifice having a length of 3 mm to 8 mm and width of 1 mm to 2 mm and where the extruded dough is cut into widths of from 2 mm to 3 mm.

19. A method according to claim 13 wherein said water is present in said dough in an amount of from 8 to 25 percent by weight of the dry composition.

20. A method according to claim 13 wherein said aerating agent is a solid material.

21. A method according to claim 13 wherein said aerating agent is a gaseous material.

22. A method according to claim 21 further comprising the step of injecting the gaseous material into the extrudate at a point which has sufficiently formed a dough capable of holding the gaseous material and permits sufficient dispersion of the gaseous material prior to exiting the extruder.

* * * * *